United States Patent [19]
Rotker et al.

[11] Patent Number: 5,687,310
[45] Date of Patent: Nov. 11, 1997

[54] SYSTEM FOR GENERATING ERROR SIGNAL TO INDICATE MISMATCH IN COMMANDS AND PREVENTING PROCESSING DATA ASSOCIATED WITH THE RECEIVED COMMANDS WHEN MISMATCH COMMAND HAS BEEN DETERMINED

[75] Inventors: Paul Stuart Rotker, West Newton, Mass.; Randall Dean Hinrichs, Nashua, N.H.

[73] Assignee: Digital Equipment Corporation, Maynard, Mass.

[21] Appl. No.: 616,976

[22] Filed: Mar. 15, 1996

Related U.S. Application Data

[63] Continuation of Ser. No. 971,377, Nov. 4, 1992, abandoned.
[51] Int. Cl.[6] .................................................. G06F 11/00
[52] U.S. Cl. ............................................... 395/182.09
[58] Field of Search .......................... 395/200.19, 500, 395/182.09, 182.1, 182.11, 800, 821, 825, 840, 841, 881, 379, 391, 392; 371/47.1

[56] References Cited

U.S. PATENT DOCUMENTS

| | | | |
|---|---|---|---|
| 3,810,119 | 5/1974 | Zieve et al. | 395/200.19 |
| 4,012,717 | 3/1977 | Censier et al. | 395/182.1 |
| 4,358,823 | 11/1982 | McDonald et al. | 395/182.09 |
| 4,616,312 | 10/1986 | Uebel | 395/182.09 |
| 5,016,249 | 5/1991 | Hurst et al. | 371/5.5 |
| 5,075,840 | 12/1991 | Grohoski et al. | 395/800 |
| 5,175,847 | 12/1992 | Mellot | 395/182.1 |
| 5,204,952 | 4/1993 | Ayers et al. | 395/200.19 |
| 5,222,237 | 6/1993 | Hillis | 395/800 |
| 5,226,152 | 7/1993 | Klug et al. | 395/182.1 |
| 5,276,823 | 1/1994 | Cutts, Jr. et al. | 395/182.09 |
| 5,317,726 | 5/1994 | Hurst | 395/182.1 |

FOREIGN PATENT DOCUMENTS

| | | |
|---|---|---|
| 0077154 | 4/1983 | European Pat. Off. . |
| 0503092 | 9/1992 | European Pat. Off. . |

*Primary Examiner*—Moustafa M. Meky
*Attorney, Agent, or Firm*—Diane C. Drozenski; Ronald C. Hudgens; Arthur W. Fisher

[57] ABSTRACT

An apparatus which provides a means of ensuring command synchronization for computer systems employing sliced gate array processors includes a computer bus, a plurality of central processing units and a plurality of input/output processors coupled to the computer bus. Each input/output processor includes means to receive commands from said central processing units. The apparatus further includes means within each of the input/output processors for generating a signal indicating the type of command received from the central processing units and means for receiving from every other input/output processor the command type signal generated by every other input/output processor. In addition, the apparatus further includes means for comparing said command type signals and generating an error signal when the comparison indicates that all of the input/output processors have not received the same command.

16 Claims, 3 Drawing Sheets

SYSTEM FOR GENERATING ERROR SIGNAL TO INDICATE MISMATCH IN COMMANDS AND PREVENTING PROCESSING DATA ASSOCIATED WITH THE RECEIVED COMMANDS WHEN MISMATCH COMMAND HAS BEEN DETERMINED

This application is a continuation of application Ser. No. 07/971,377, filed Nov. 4, 1992, now abandoned.

BACKGROUND OF THE INVENTION

This invention relates generally to computer systems, and more particularly to communication between multiple central processing units (CPUs) and multiple input/output (I/O) processors.

As it is known in the art, computer systems include at least one central processing unit and a memory system. A computer also includes a set of signal lines commonly referred to as a bus. The bus carries address, data, and control information to and from the CPU. The CPU executes instructions fetched from a memory thus providing central control of the computer. Generally the CPU sends and receives data via the bus from the memory and external devices commonly referred to as peripheral devices. Examples of peripheral devices include disk drives, tape drives, and printers.

An I/O processor is generally coupled to the bus and is used to format and manipulate data being transferred between the CPU and various peripheral devices. The I/O processor also serves as a data buffer between the CPU and the peripheral devices. Use of an I/O processor allows the CPU to operate more efficiently since the CPU can perform other tasks while the I/O processor is sending data to or receiving data from the peripheral devices. In addition, the I/O processor is used to format data transmitted from peripheral devices which use differing data transfer formats. This formatting provides data which is useable by the CPUs and other peripheral devices.

In order to increase the performance of a computer system, computer system designers generally provide a system bus which is relatively wide. That is, the bus is generally several multiples of a byte of data. Commonly used system bus widths are 64 bits and 128 bits. A bus that is 128 bits wide is capable of transmitting 128 bits of data during each bus cycle. Due to physical constraints (such as the quantity of pins available) or functional constraints, the devices which communicate over the system bus i.e., the CPU chips and I/O processor chips, may not be able to process the full 128 bits of data during a single bus cycle. These constraints have led computer system designers to build computers that exploit a so called "Sliced" gate array design for both the CPU and the I/O processor. In a sliced gate array design, the CPU would include two or more gate array devices each coupled to a portion of the system bus and each responsible for processing the information transmitted over that portion of the system bus. Likewise, the I/O processor of a sliced gate array design includes two or more gate array devices each coupled to a portion of the system bus. This design allows the computer to process illustratively 128 bits of data during each bus cycle, whereas a single chip design would only be capable of processing illustratively 64 bits of data during each bus cycle, thus requiring additional bus cycles to complete a data transfer.

A typical sliced gate array design partitions the system bus into four discrete so called "longword" segments. Each segment is 32 bits of the 128 bit wide system bus. During the command/address bus cycle, two of the 32 bit longwords will include address information and two of the 32 bit longwords will include command information. During the data bus cycle, the four longwords will include 128 bits of data to be transferred to (or from) an I/O processor or memory or any other device directly coupled to the system bus. With a sliced gate array system design, the CPU and I/O processor each have two so called "gate array slices", a so called "even slice" and a so called "odd slice". Each gate array slice is a separate physical device coupled to the system bus and is responsible for processing one half (or two longwords) of the 128 bit wide data. The even slice CPU gate array communicates with the even slice I/O gate array, and the odd slice CPU gate array communicates with the odd slice I/O processor gate array.

In order for data to be properly processed by the I/O processor gate arrays, each gate array of the I/O processor performs the same operation (e.g. read or write) at the same time on the data supplied during the data bus cycle. To accomplish this, each gate array slice of the CPU places the same address and command information on the bus during one bus cycle followed by one half of the particular data on a subsequent bus cycle. For example, during the first bus cycle (i.e. address/command bus cycle), four longwords (32 bits each) of information will be transmitted from the CPU to the I/O processor. During that transmission, the first and second longwords will be identical and contain address data to be sent to the even slice and odd slice I/O gate arrays respectively. Similarly, the third and fourth longwords will be identical but instead of address data, they will contain command data to be sent to the even and odd slice I/O gate arrays respectively. This procedure ensures that each gate array slice of the I/O processor is performing the same operation (i.e. read or write) on the two halves of data supplied by the two CPU gate array slices during the data bus cycle.

One problem with the above mentioned synchronization technique is that the technique requires that the CPU gate arrays always operate properly. That is, both CPU gate array slices will send the same command to each I/O gate array slice. In practice however, unforeseeable conditions, such as a CPU error or an error occurring during transmission, may cause different commands to be received by each of the I/O gate arrays during the same bus cycle. This will cause the I/O processor to perform different operations on each half of the subsequent data supplied during a subsequent (data) bus cycle. This mismatch in commands is not generally detectable by any other error checking hardware. The result of this command mismatch is a bad cycle on the system bus which would go undetected leading to a corruption of memory.

Previous methods of synchronization have included the use of complex signaling schemes between the CPUs and the I/O processors. These schemes require additional signal lines to be run between the CPUs and the I/O processors. Other synchronization methods have included signaling schemes between the CPU gate arrays. The drawback of these methods is that they do not detect a command mismatch when it occurs as a result of corruption during command transmission from the CPU gate arrays to the I/O gate arrays.

SUMMARY OF THE INVENTION

In accordance with the present invention, an apparatus includes a plurality of central processing units coupled to a computer bus and a plurality of input/output devices also coupled to said computer bus. Each of the plurality of input/output processors includes means for generating a control signal indicating a command type which is to be executed, means for comparing said control signal generated from each of said input/output processors, and means for generating an error signal indicating a mismatch in commands to be processed by each of said plurality of input/output processors. The apparatus further includes means for issuing a control signal to each of said plurality of central processing units when a mismatched set of commands is received by said plurality of input/output processors. With such an arrangement, a network is provided which analyzes command indicator signals generated from each of said input/output processors and generates an error signal in the event that all of the signals are not the same. Thus, this arrangement ensures command synchronization and prevents memory corruption within a computer system wherein multiple central processing units communicate with multiple input/output processors to perform a single operation.

DETAILED DESCRIPTION OF THE PREFERRED EMBODIMENT

Figure 1:
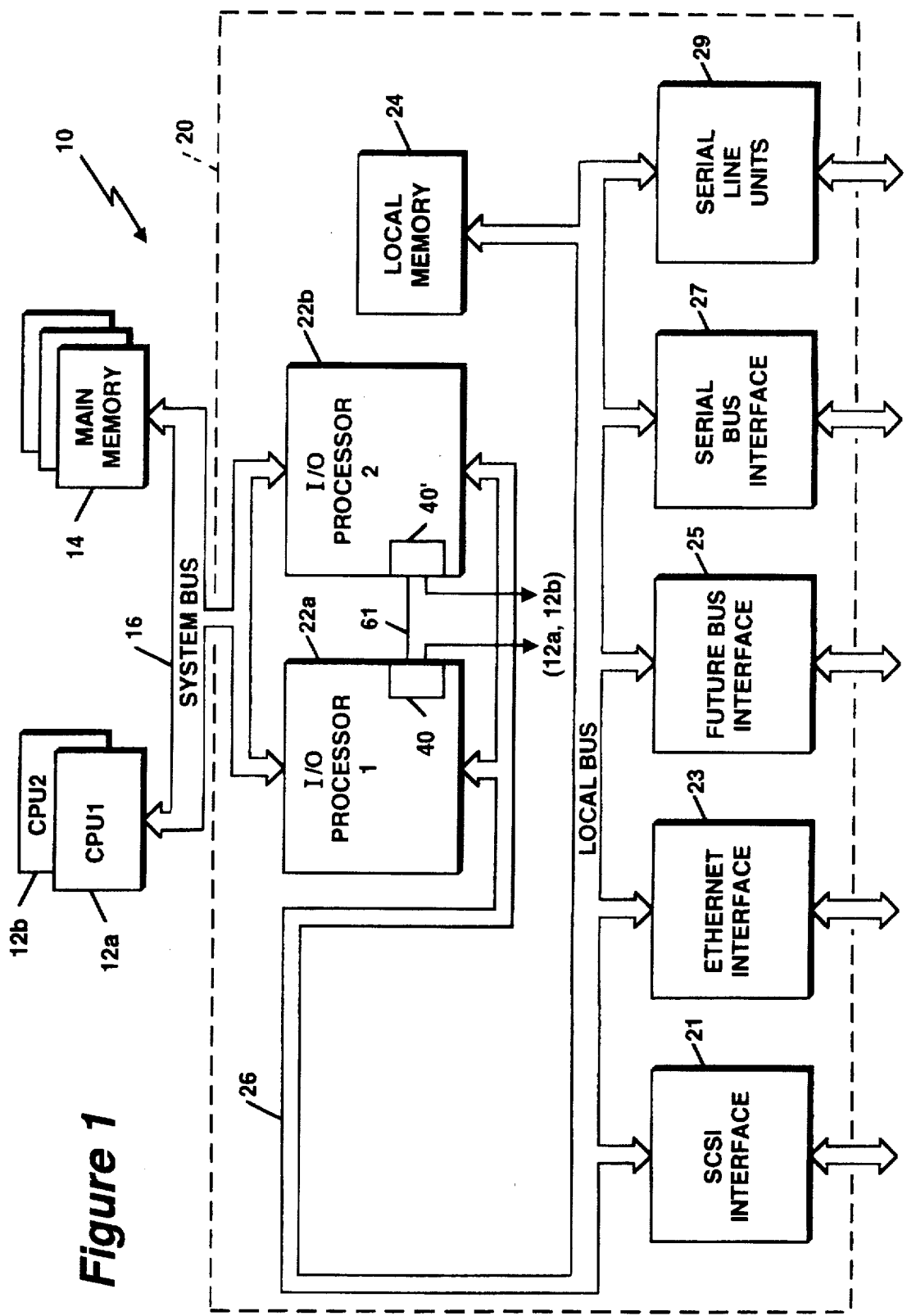
FIG. 1 is a block diagram of a computer system including an input/output subsystem.

Referring now to FIG. 1, a computer system 10 is shown to include a plurality of central processing units (CPUs) 12a and 12b, a main memory bank 14, and an input/output (I/O) subsystem 20. The CPUs 12a and 12b are coupled to the main memory 14 and the input/output subsystem 20 via a system bus 16. The system bus 16 is a so called pended bus. A pended bus is bus design which provides for greater efficiency within computer systems. In a system using a pended bus, a processor gains control of the bus (through arbitration) and initiates a first transaction (usually within another processor or memory). Rather than maintain control of the bus during the period in which the transaction is processed, the initiating processor releases control of the bus thus allowing another processor to initiate a second transaction. If the processor maintained control of the bus during the entire transaction, the computer system would be stalled waiting for the transaction to complete. This stalled condition would result in wasted clock cycles and contribute to an overall inefficient computer system. Once the second processor has initiated the second transaction, it too releases control of the bus so that other processors can initiate transactions and so that the results of transactions which have been complete can be transmitted back to the initiating processor. By using a pended bus design, computer systems can perform many more operations in less time.

The I/O subsystem 20 is comprised of an I/O processor 22 including two gate arrays 22a, 22b commonly referred to as slices. The I/O processor 22 is coupled by a local bus 26 to a Small Computer System Interface (SCSI) 21, an Ethernet Interface 23, a Future Bus Interface 25, a Serial Bus Interface 27 and a Serial Line Units subsystem 29. The SCSI interface is used to format and manipulate data to ensure proper communication between the CPUs 12a and 12b and peripheral devices which use the SCSI protocol for data transfer. Examples of peripheral devices which conform to the SCSI communication protocol and are commonly used in computer systems are disk storage devices, tape storage devices, and printers. The local bus 26 also attaches to I/O processors 22a, 22b to an Ethernet Interface 23 which provides data formatting and control for communication between separate computer systems connected to a computer network conforming to the Ethernet communication protocol and a Future Bus Interface 25 which is used to format and manipulate data to facilitate communication between the CPUs 12a and 12b and devices which use the Future Bus convention for data transfer. The Futurebus interface is generally used to couple multiple computers to form a single powerful computer system.

The Serial Line Units 29 is a system of universal asynchronous receiver-transmitters (UART). This system allows a plurality of terminal devices to be coupled to the I/O subsystem. The Serial Bus Interface 27 is a single UART which allows for a single terminal to be connected to the I/O subsystem. The Local Memory system 24 is a combination of random access memory (RAM) and programmable read only memory (PROM). The RAM portion of the Local Memory 24 is used by the SCSI interface system 21 for the storage of software instructions which are executed by the various SCSI controllers contained within the SCSI interface system 21. The PROM portion of the Local Memory 24 is used to store instructions which are read by the CPUs 12a and 12b when the computer 10 is started or restarted. The CPUs 12a and 12b will copy the instructions to their local memory area commonly referred to as "cache" and then execute the instructions to perform an initialization of the computer system. The Ethernet Interface 23 also uses a portion of PROM for the storage of information relating to network addresses or identities of computers connected to a computer network.

Figure 2:
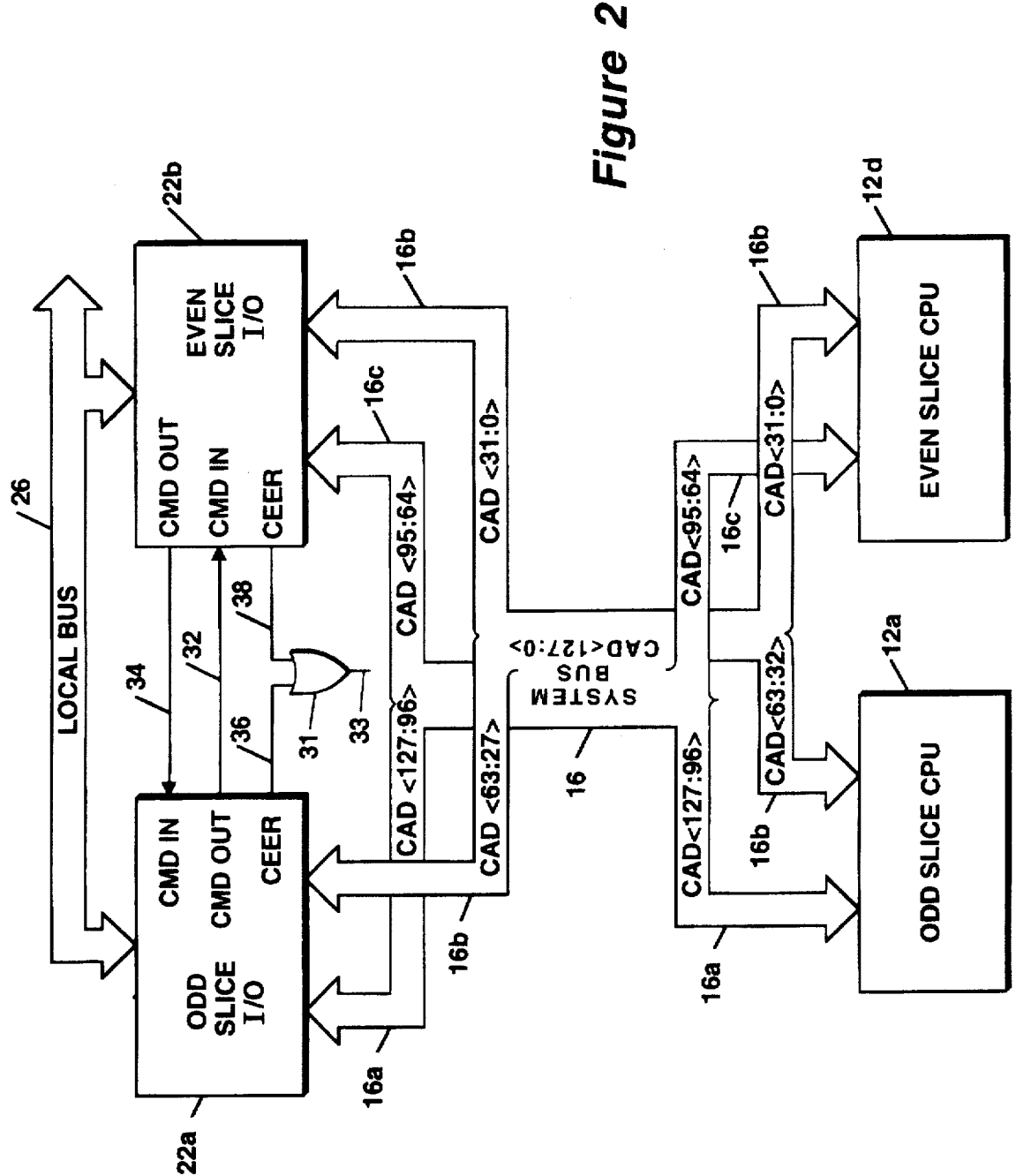
FIG. 2 is a diagram of a system bus partitioned between CPU and I/O gate arrays.

Referring now to FIG. 2, the CPU 12 is shown to be comprised of gate array slices 12a, 12b which are interfaced to a bus 16. The system bus 16 is partitioned into four so called "longword" segments 16a–16d. Each longword includes thirty two bits (or signal lines) which carry command, address, and data (CAD) information to and from the CPU gate array slices 12a and 12b, the main memory 14 (FIG. 1), and the I/O processor gate array slices 22a and 22b. Here, each longword segment is referred to with the following nomenclature CAD<#:#>, where CAD represents the system bus 16, and the # symbols on the left and right hand side of the ':' represent a starting and ending bit respectively of a section of the system bus. As an example, a longword on bus segment 16a includes bits 96 through 127 and would be represented as CAD<127:96>. Longwords on bus segments 16b, 16c, and 16d would be represented as CAD<63:32>, CAD<95:64>, and CAD<31:0> respectively. By segmenting the system bus 16, each CPU gate array slice 12a, 12b and each I/O gate array slice 22a, 22b is only required to process 64 bits of command, address, or data information during each bus cycle, and as a result, 128 bits of information can be processed during each bus cycle.

During the command/address bus cycle, longword segments on bus portions 16a and 16c will carry the same command (read or write) information from the odd slice CPU gate array 12a and the even slice CPU gate array 12b to the odd slice I/O gate array 22a and the even slice I/O gate array 22b respectively. Similarly, during the same bus cycle, longword segments on bus portions 16b and 16d will carry the same address information from the odd slice CPU gate array 12a and the even slice CPU gate array 12b to the odd slice I/O gate array 22a and the even slice I/O gate array 22b respectively. Since the longwords on bus segments 16a and 16c will be identical as well as the longwords on bus segments 16b and 16d, each I/O slice gate array 22a, 22b will perform the same operation on the 128 bits of data supplied by the CPU gate array slices 12a, 12b during the subsequent (data) bus cycle.

However, errors can occur which prevent the I/O gate array slices 22a and 22b from receiving the same commands from the CPU gate array slices 12a and 12b during the same bus cycle. To prevent the I/O gate array slices 22a and 22b from performing two different operations on each half of the data supplied during the subsequent data bus cycle, each I/O gate array slice 22a and 22b includes a command synchronization detection circuit 40 and 40' (FIG. 1) respectively.

Figure 3:
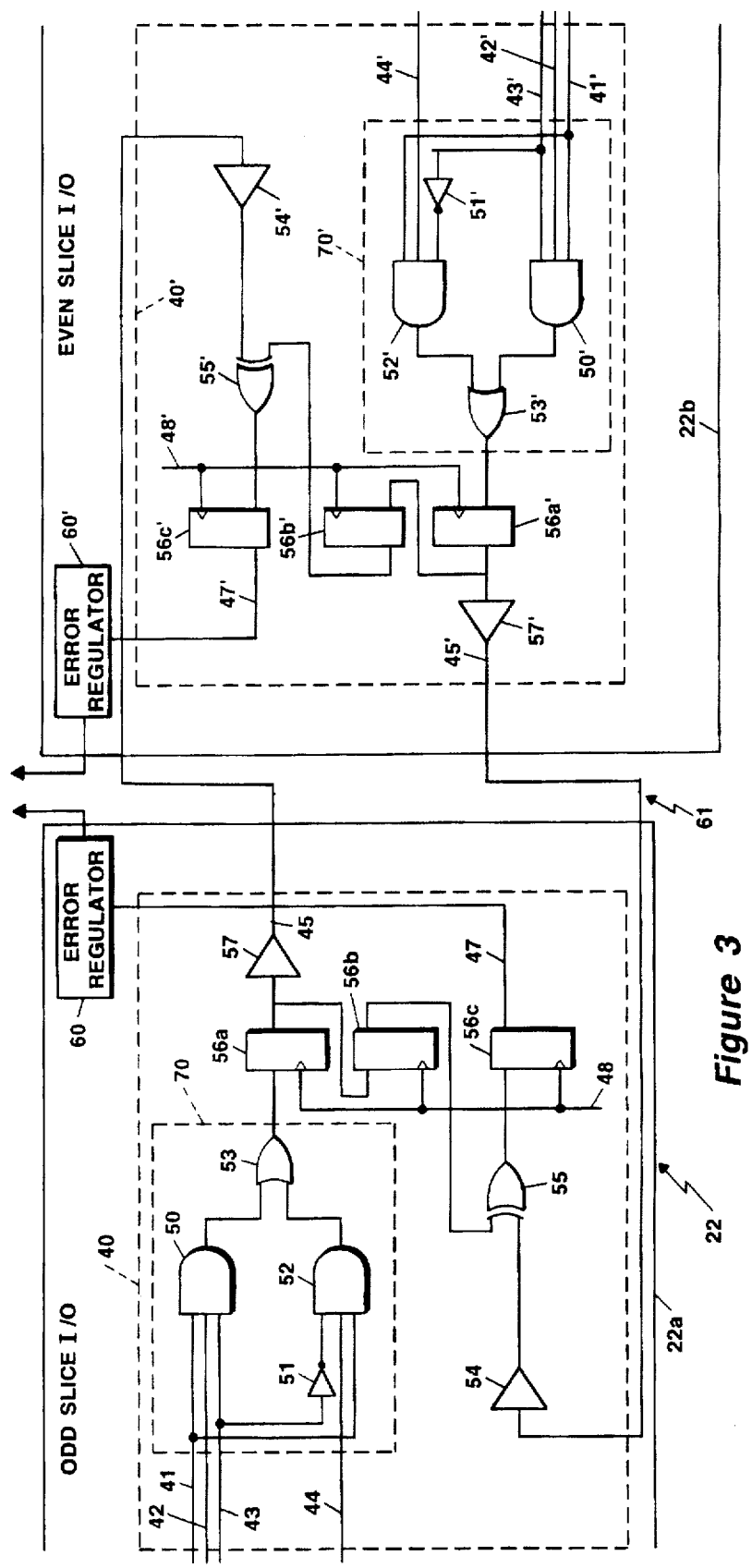
FIG. 3 is a schematic diagram of the combinational logic circuits which perform a command synchronization check.

The forthcoming description of the functionality of command synchronization detection circuit 40 also describes the functionality of command synchronization detection circuit 40'. The only difference being that the assertion or de-assertion of the signal lines 41'-45' is dependent on the command received by the even slice I/O gate array 22b from the even slice CPU gate array 12b (FIG. 2) rather than the odd slice I/O gate array 22a receiving commands from the odd slice CPU gate array 12a. Referring now to FIG. 3, I/O processor gate array slices 22a and 22b are shown to include command synchronization detection circuits 40 and 40' respectively which perform a command synchronization check on the commands received from the CPU gate array slices 12a and 12b (FIG. 2). To perform the command synchronization function, the command synchronization detection circuits 40 and 40' analyze signals on signal lines 41-45 and 41'-45' respectively.

After CPU gate arrays 12a and 12b (FIG. 2) have sent commands to the I/O gate arrays 22a and 22b, internal signals 41-45 and 41'-45' are produced with their asserted or de-asserted state depending on the command received from the CPU gate arrays 12a and 12b (FIG. 1). These signals are then processed by the command synchronization detection circuits 40 and 40' to ensure that the same command was received by both I/O gate arrays 22a and 22b. For example, when the odd slice I/O gate array 22a receives a write command from CPU gate array 12a, signal 42 will be asserted or "TRUE" indicating that the received command is not a read command otherwise is will be de-asserted or "FALSE". Signal line 43 carries the so called "bus commander" signal. This signal line will be asserted or "TRUE" whenever the odd slice I/O gate array 22a is about to perform a write command (i.e. gains control of the bus) and will be de-asserted or "FALSE" otherwise. Signal line 44 is used to indicate that the odd slice I/O gate array 22a has received a write command. When the odd slice I/O gate array 22a has received a write command from the odd slice CPU gate array 12a (FIG. 2) signal line 44 will be asserted or "TRUE". If I/O gate array 22a receives a command other than a write command, signal line 44 will be de-asserted or "FALSE". Signal line 41 is used to control when a comparison of commands is to be performed. After the odd slice I/O gate array receives a command and a comparison needs to be performed, signal line 41 will be asserted or "TRUE".

Signal lines 41-44 are analyzed with a suitable logic circuit here shown as command type analyzer 70 and including AND gates 50, 52, inverter 51, and OR gate 53. The output of the command type analyzer 70 (output of OR gate 53) is delayed two clock cycles via flip-flops 56a and 56b and transmitted to exclusive-OR (XOR) gate 55. The command type analyzer circuit 70 provides an output signal at the output of OR gate 53 which indicates the type of command which is going to be performed by the odd slice I/O processor 22a. A similar command type analyzer circuit 70' is provided within command synchronization detection circuit 40' and performs the same function as command type analyzer circuit 70.

Each command synchronization detection circuit 40 and 40' has an additional input signal carried by signal lines 45' and 45 respectively. Signal line 45' provides an output from command synchronization detection circuit 40' and is used an input to command synchronization detection circuit 40, whereas signal line 45 provides an output from command synchronization detection circuit 40 and is used as an input to command synchronization detection circuit 40'. The signal on signal line 45' is compared via the XOR gate 55 with a delayed (two clock cycles) output of OR gate 53 to determine if a command mismatch has occurred. Likewise, signal line 45 is compared via XOR gate 55' against the output of OR gate 53' (delayed tow clock cycles) to determine if a mismatch in commands has occurred.

As an illustrative example of the operation of command synchronization detection circuit 40 and 40', consider the case when each I/O gate array 22a and 22b has just received a write command from each CPU gate array 12a and 12b (FIG. 1). Prior to executing the write command, the I/O gate arrays will perform a command synchronization check using command synchronization detection circuit 40 and 40'. Having received a write command, signal lines 42 and 42' will be asserted or "TRUE". In addition, since the command to be performed is going to be a write command, each I/O gate array 22a and 22b will become the bus commander causing signal lines 43 and 43' to be asserted or "TRUE". Also, signal lines 44 and 44' will be asserted or "TRUE" since the command received was a write command. Lastly, when the I/O gate arrays 22a and 22b execute the command synchronization check, each I/O gate array 22a, 22b will assert lines 41 and 41' respectively. At this point, signal lines 41-43, and 41'-43' will all be asserted or "TRUE" causing the outputs of AND gates 50 and 50' to be "TRUE" and the outputs of AND gates 52 and 52' to be "FALSE". When the output of gate 50 is "TRUE" and the output of gate 52 is "FALSE", the output of the OR gate 53 will be "TRUE". The same holds for gates 50', 52', and 53' of command synchronization detection circuit 40'. The output of gate 53 is then provided as an input to the flip-flop 56a and will become the input signal to the XOR gate 55' in combinational command synchronization detection circuit 40' when a falling edge is detected on signal line 48.

Flip-flops 56a and 56b as well as 56a' and 56b' are arranged in a cascaded fashion and have as an input clock signal line 48. These flip-flops provide a delay function which is necessary to compensate for the timing differences between I/O gate arrays 22a and 22b. Clock signal lines 48 and 48' are used to clock the resultant command indication signals (output of OR gates 53 and 53') of the command analysis circuit as described above between the two I/O gate arrays 22a and 22b. The command indication signal from command synchronization circuit 40' of I/O slice 22b is compared with the corresponding command identification signal clocked from flip-flop 56b in command synchronization circuit 40 at the XOR gate 55. A similar comparison is performed at XOR gate 55'. If both signals are TRUE (as would be the case if both I/O gate arrays received a write command) the outputs of exclusive OR gates 55 and 55') would be "FALSE". These output i.e., signals 47 and 47' provide inputs to error registers 60 and 60' respectively. Once the comparison is completed, the CPUs 12a and 12b read the registers 60 and 60' respectively via signal lines 72 and 74 to determine if an error has occurred.

Here, illustratively error registers 60 and 60' would store status bits indicating that there is no error as should be the case when both I/O gate arrays 22a and 22b receive a write command.

To further illustrate how the command synchronization detection circuits 40 and 40' operate, consider the case when two different commands are received by the two I/O gate arrays 22a and 22b. In this example, the odd slice I/O gate array 22a has received a read command while the even slice I/O gate array 22b has received a write command. As described above, a write command received by odd slice I/O gate array 22a will cause signal lines 42–44 of command synchronization circuit 40 to be asserted or "TRUE". When signal line 41 is asserted by the odd slice I/O gate array 22b the command synchronization check will be performed ultimately resulting in the output of flip-flop 56b being asserted or "TRUE". The output of flip-flop 56b serves as one input to XOR gate 55. In addition, signal line 45 will be asserted or "TRUE" since it too represents the result of the analysis of signal lines 42–44. Signal line 45 then provides an input to command synchronization circuit 40' as a basis for comparison.

Conversely, when the even slice I/O gate array 22b receives a read command, signal line 42' of command synchronization circuit 40' will be de-asserted or "FALSE". Additionally, since the command received was not a write, signal line 43' will be de-asserted or "FALSE" since the even slice I/O gate array 22b is not the bus commander unless the command received is a write command. Also, signal line 44' will be de-asserted or "FALSE" as well since the received command was not a write command. The even slice I/O gate array 22b will assert signal line 41' when the command synchronization check is to be performed. At this point, signal lines 42'–44' will be de-asserted or "FALSE" while signal line 41' is asserted or "TRUE". This combination of signals will result in the output of AND gates 50' and 52' being de-asserted or "FALSE". As a result, the output of OR gate 53' will also be "FALSE". The output of OR gate 53' ultimately provides an input to XOR gate 55' as well as XOR 55 of command synchronization circuit 40.

At this point in the comparison cycle, the XOR gates 55 and 55' of command synchronization circuits 40 and 40' respectively will both have one asserted or "TRUE" input signal and one de-asserted or "FALSE" input signal. As a result, the output of XOR gates 55 and 55' will both be "TRUE". This will cause an error bit to be set in the error registers 60 and 60' of the I/O gate arrays 22a and 22b respectively. After the error bits are set, the I/O gate array slices 22a and 22b will send an acknowledgement back to the CPU gate arrays 12a and 12b. Upon receiving the acknowledgement, the CPU gate arrays 12a and 12b will read the error registers 60 and 60' of the I/O gate arrays 22a and 22b. By reading the error registers 60 and 60' the CPU gate arrays 12a and 12b will determine that there has been an error during the command/address bus cycle and as a result will not send the pending data to be processed. Depending on how the error handling system has been designed, the CPU gate arrays may do a number of things including posting a notification, retrying the command/ address bus cycle, or aborting the operation altogether. In any event, by not sending the pending data, the system has avoided performing an erroneous process which could have resulted in a corruption of memory.

Having described a preferred embodiment of the invention, it will now become apparent, to one of skill in the art that other embodiments incorporating its concepts may be used. It is felt therefore, that this embodiment should not be limited to the disclosed embodiment, but rather should be limited only by the spirit and scope of the appended claims.

What is claimed is:

1. A processor for processing commands and data received over a bus from a plurality of central processing units where said processor is partitioned into a plurality of sub-processors and said bus is correspondingly partitioned and coupled to said plurality of sub-processors and where each of said sub-processors processes a portion of data associated with said commands received over said bus, said processor comprising:

means within each one of said sub-processors for generating a control signal indicating a command type which is to be executed by said one of said sub-processors;

means within said each one of said sub-processors for receiving other control signals correspondingly generated by others of said plurality of sub-processors and for comparing said control signal with said other control signals;

means within each one of said sub-processors for generating an error signal indicating a mismatch in commands received by said one of said sub-processors; and means responsive to said comparing means for preventing processing of said data associated with said received commands when command mismatch has been determined.

2. The processor as in claim 1 wherein said means for comparing said control signal with said other control signals comprises a combinational logic circuit.

3. The processor as in claim 1 wherein said means for generating an error signal indicating a mismatch comprises a storage register, said storage register being coupled to said comparing means and having a data bit used to store a result of said comparing means.

4. The processor according to claim 1 wherein said means for preventing processing includes means for preventing said central processing unit from transmitting data associated with said mismatched command.

5. An input/output system comprising:

a plurality of input/output processors, each of said input/ output processors capable of receiving data and commands, via a bus, from a plurality of central processing units where each of said input/output processors is responsible for performing like operations on portions of data transmitted thereto over said bus;

means within each of said input/output processors for generating a control signal indicating a command type received from each corresponding central processing units which is to be executed by said input/output processors;

means within each of said input/output processors for transmitting said control signal to every other input/ output processor;

means within each of said input/output processors for receiving said transmitted control signals;

means within each of said input/output processors for comparing said received control signals with said generated control signal;

means within each of said input/output processors for generating an error signal indicating a mismatch in commands received by each of said input/output processors;

means responsive to said comparing means for preventing processing of said data when said command mismatch has been determined; and means for transmitting said error signal to said plurality of central processing units.

6. The input/output system as in claim 5 wherein said means for comparing said generated control signal with said received control signals a combinational logic circuit.

7. The input/output system as in claim 5 wherein said means for generating an error signal indicating a mismatch comprises a storage register, said storage register being coupled to said comparing means and having a data bit used to store a result of said comparing means.

8. The input/output system according to claim 5 wherein said means for preventing processing includes means for preventing said central processing units from transmitting data associated with said mismatched commands.

9. A computer system comprising:
a computer bus;
a plurality of central processing units, said plurality of central processing units coupled to said computer bus;
a plurality input/output devices, said plurality of input/output devices coupled to said computer bus such that each one of said input/output devices corresponds to one of said plurality of central processing units and is responsible for processing a portion of data associated with a common command transmitted over said computer bus by said plurality of central processing units and each of said input/output devices further comprising:
   means within said input/output device for generating a control signal indicating a command type which is to be executed by said input/output device;
   means within said input/output device for comparing said generated control signal with received control signals from others of said input/output devices;
   means for generating an error signal indicating a mismatch in commands to be processed by each of said plurality of input/output processors;
means responsive to said comparing means for preventing processing of said data when said command mismatch has been determined; and
means for issuing a control signal to each of said plurality of central processing units, said control signal being asserted when a mismatched set of commands is received by said plurality of input/output processors.

10. The computer system as in claim 9 wherein said means for comparing said generated control signal with received control signals from each said input/output devices comprises a combinational logic circuit.

11. The computer system as in claim 10 wherein said combinational logic circuit comprises a command analyzer circuit, a timing compensator circuit, and a comparison circuit.

12. The computer system as in claim 9 wherein said means for generating an error signal indicating a mismatch in commands comprises a storage register, said storage register being coupled to said comparing means and having a data bit used to store a result of said comparing means.

13. The computer system as in claim 9 wherein said computer bus is a pended bus.

14. The computer system according to claim 9 wherein said means for preventing processing includes means for preventing said central processing unit from transmitting data associated with said mismatched command.

15. A method for monitoring command synchronization comprising the steps of:
transmitting identical command information from a plurality of central processing units to a corresponding plurality of input/output processors;
receiving said command information within each one of said plurality of input/output processors;
transmitting a signal from each of a corresponding one of said plurality of input/output processors to each remaining one of said plurality of input/output processors, said transmitted signal indicating a type of command to be performed by the corresponding one of said plurality of input/output processors;
receiving at each of said input/output processors, the signals transmitted by others of said plurality of input/output processors;
comparing said transmitted signal to said received signals;
generating an error signal when said received signals are different from said transmitted signal
preventing execution of said commands when said received signals are different from said transmitted signal; and
transmitting said error signal to said central processing units.

16. The method according to claim 15 wherein said step of preventing includes preventing said central processing units from transmitting data associated with said command information to said plurality of input/output processors.

* * * * *